United States Patent
Kim et al.

(10) Patent No.: US 12,300,849 B2
(45) Date of Patent: May 13, 2025

(54) SEPARATOR FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Gain Kim, Yongin-si (KR); Dongwan Seo, Yongin-si (KR); Yeonjoo Choi, Yongin-si (KR); Yangseob Kim, Yongin-si (KR); Yongkyoung Kim, Yongin-si (KR); Jungyoon Lee, Yongin-si (KR); Hyeonsun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 712 days.

(21) Appl. No.: 17/294,343

(22) PCT Filed: Aug. 8, 2019

(86) PCT No.: PCT/KR2019/009945
§ 371 (c)(1),
(2) Date: May 14, 2021

(87) PCT Pub. No.: WO2020/130268
PCT Pub. Date: Jun. 25, 2020

(65) Prior Publication Data
US 2022/0013859 A1   Jan. 13, 2022

(30) Foreign Application Priority Data
Dec. 20, 2018   (KR) .................. 10-2018-0166512

(51) Int. Cl.
*H01M 50/42* (2021.01)
*H01M 10/052* (2010.01)
(Continued)

(52) U.S. Cl.
CPC ......... *H01M 50/42* (2021.01); *H01M 10/052* (2013.01); *H01M 50/443* (2021.01); *H01M 50/449* (2021.01); *H01M 50/491* (2021.01)

(58) Field of Classification Search
None
See application file for complete search history.

(56) References Cited

U.S. PATENT DOCUMENTS

2006/0263693 A1   11/2006   Kim et al.
2010/0112454 A1*   5/2010   Visco ............... H01M 4/366
                                                  429/246
(Continued)

FOREIGN PATENT DOCUMENTS

CA   2881701 A1 *   3/2014   ............ C08F 120/56
CN   1855584 A      11/2006
(Continued)

OTHER PUBLICATIONS

European Search Report for EP 19898811.5 dated Aug. 3, 2022, 11 pages.
(Continued)

*Primary Examiner* — Christian Roldan
*Assistant Examiner* — Robert Gene West
(74) *Attorney, Agent, or Firm* — Womble Bond Dickinson (US) LLP

(57) ABSTRACT

The present invention relates to a separator for a lithium secondary battery, and a lithium secondary battery including the same. The separator includes a porous substrate, and a coating layer on at least one surface of the porous substrate, wherein the coating layer includes a (meth)acrylic copolymer including a first structural unit derived from (meth)acrylamide, a second structural unit derived from (meth)acrylonitrile, and a third structural unit including at least one of structural units derived from (meth)acrylamidosulfonic (Continued)

acid, a (meth)acrylamidosulfonic acid salt, or a combination thereof; inorganic particles; and an organic filler; wherein the organic filler is included in an amount of 0.1 to 50 wt % based on a total amount of the organic filler and the inorganic particles.

13 Claims, 1 Drawing Sheet

(51) Int. Cl.
  *H01M 50/443* (2021.01)
  *H01M 50/449* (2021.01)
  *H01M 50/491* (2021.01)

(56) References Cited

U.S. PATENT DOCUMENTS

| | | |
|---|---|---|
| 2010/0233409 A1 | 9/2010 | Kamiya et al. |
| 2011/0318630 A1 | 12/2011 | Wakizaka et al. |
| 2012/0115036 A1 | 5/2012 | Lee et al. |
| 2013/0017429 A1 | 1/2013 | Ha et al. |
| 2013/0252066 A1 | 9/2013 | Yeou et al. |
| 2013/0302661 A1 | 11/2013 | Kim et al. |
| 2013/0323569 A1 | 12/2013 | Yeou et al. |
| 2013/0330590 A1 | 12/2013 | Toyoda |
| 2014/0050965 A1 | 2/2014 | Ha et al. |
| 2014/0120402 A1 | 5/2014 | Yu et al. |
| 2014/0342226 A1 | 5/2014 | Toyoda |
| 2014/0186680 A1* | 7/2014 | Kim ............... H01M 50/42 429/144 |
| 2014/0272532 A1 | 9/2014 | Park et al. |
| 2014/0147726 A1 | 11/2014 | Sasaki |
| 2015/0010815 A1 | 1/2015 | Chung et al. |
| 2015/0030933 A1* | 1/2015 | Goetzen ............ H01M 50/403 429/251 |
| 2015/0111086 A1 | 4/2015 | Arnold et al. |
| 2016/0013465 A1 | 1/2016 | Akiike |
| 2016/0141581 A1 | 5/2016 | Sasaki et al. |
| 2016/0149184 A1 | 5/2016 | Nam et al. |
| 2016/0149190 A1 | 5/2016 | Fukuchi |
| 2016/0181618 A1* | 6/2016 | Hoshiba ............ H01M 50/403 429/94 |
| 2016/0344007 A1 | 11/2016 | Toyoda et al. |
| 2017/0162848 A1 | 6/2017 | Pan et al. |
| 2017/0200932 A1 | 7/2017 | Sasaki et al. |
| 2017/0326863 A1 | 11/2017 | Wang et al. |
| 2017/0338461 A1* | 11/2017 | Seo ............... H01M 50/42 |
| 2018/0053963 A1 | 2/2018 | Tanaka |
| 2018/0114966 A1 | 4/2018 | Yasuda et al. |
| 2018/0337381 A1 | 11/2018 | Seo et al. |
| 2018/0351149 A1 | 12/2018 | Aklike et al. |
| 2018/0358649 A1 | 12/2018 | Inoue et al. |
| 2019/0013504 A1 | 1/2019 | Choi et al. |
| 2019/0106521 A1 | 4/2019 | Takamatsu |
| 2019/0245183 A1 | 8/2019 | Jeong et al. |
| 2019/0288293 A1* | 9/2019 | Arihara .............. H01M 4/668 |
| 2020/0388808 A1 | 12/2020 | Choi et al. |
| 2021/0226299 A1 | 7/2021 | Choi et al. |
| 2021/0234235 A1 | 7/2021 | Kang et al. |
| 2022/0013859 A1 | 1/2022 | Kim et al. |
| 2022/0029244 A1 | 1/2022 | Kim et al. |
| 2022/0037739 A1 | 2/2022 | Lee et al. |
| 2022/0037741 A1 | 2/2022 | Lee et al. |
| 2022/0102810 A1 | 3/2022 | Kim et al. |

FOREIGN PATENT DOCUMENTS

| | | |
|---|---|---|
| CN | 102770984 A | 11/2012 |
| CN | 102893427 A | 1/2013 |
| CN | 103390740 A | 11/2013 |
| CN | 103620820 A | 3/2014 |
| CN | 103718336 A | 4/2014 |
| CN | 103857732 A | 6/2014 |
| CN | 104277746 A | 1/2015 |
| CN | 104521031 A | 4/2015 |
| CN | 105324868 A | 2/2016 |
| CN | 105378989 A | 3/2016 |
| CN | 105440770 A | 3/2016 |
| CN | 105531854 A | 4/2016 |
| CN | 106328865 A | 1/2017 |
| CN | 107394087 A | 11/2017 |
| CN | 107851765 A | 3/2018 |
| CN | 108305970 A | 7/2018 |
| CN | 108463904 A | 8/2018 |
| CN | 108666499 A | 10/2018 |
| CN | 108963148 A | 12/2018 |
| CN | 109037564 A | 12/2018 |
| CN | 109075291 A | 12/2018 |
| CN | 113228397 A | 8/2021 |
| EP | 2549564 A2 | 1/2013 |
| EP | 2779277 A1 | 9/2014 |
| EP | 3246969 A1 | 11/2017 |
| EP | 3588636 A1 | 1/2020 |
| EP | 3748730 A1 | 12/2020 |
| EP | 3855529 A1 | 7/2021 |
| EP | 3902027 A1 | 10/2021 |
| EP | 3902028 A1 | 10/2021 |
| EP | 3905381 A | 11/2021 |
| EP | 3907781 A1 | 11/2021 |
| JP | 03-175023 A | 7/1991 |
| JP | 2011-832 A | 1/2011 |
| JP | 2011-5670 A | 1/2011 |
| JP | 2014-149935 A | 8/2014 |
| JP | 2014-225410 A | 12/2014 |
| JP | 2014-229406 A | 12/2014 |
| JP | 2015-88253 A | 5/2015 |
| JP | 2015-088253 A | 5/2015 |
| JP | 2015-185530 A | 10/2015 |
| JP | 2016-105398 A | 6/2016 |
| JP | 2017-050149 A | 3/2017 |
| JP | 2017-103206 A | 6/2017 |
| JP | 2018-26266 A | 2/2018 |
| JP | 2018-34496 A | 3/2018 |
| JP | 2018-092701 A | 6/2018 |
| JP | 2019-57486 A | 4/2019 |
| JP | 2020-87591 A | 6/2020 |
| KR | 10-2011-0097715 A | 8/2011 |
| KR | 10-2011-0104791 A | 9/2011 |
| KR | 10-2012-0093772 A | 8/2012 |
| KR | 10-2012-0097238 A | 9/2012 |
| KR | 10-1254693 B1 | 4/2013 |
| KR | 10-2014-0044757 A | 4/2014 |
| KR | 10-2014-0116415 A | 10/2014 |
| KR | 10-2014-0147742 A | 12/2014 |
| KR | 10-2015-0034825 A | 4/2015 |
| KR | 10-2016-0033692 A | 3/2016 |
| KR | 10-2016-0061165 A | 5/2016 |
| KR | 10-2016-0109669 A | 9/2016 |
| KR | 10-2016-0118979 A | 10/2016 |
| KR | 10-2017-0003020 A | 1/2017 |
| KR | 10-2017-0015149 A | 2/2017 |
| KR | 10-2017-0045438 A | 4/2017 |
| KR | 10-2017-0084597 A | 7/2017 |
| KR | 10-2017-0095024 A | 8/2017 |
| KR | 10-2017-0129645 A | 11/2017 |
| KR | 10-2018-0003177 A | 1/2018 |
| KR | 10-1868240 B1 | 6/2018 |
| KR | 10-2018-0109740 A | 10/2018 |
| WO | WO 2009/060787 A1 | 5/2009 |
| WO | WO 2010/074205 A1 | 7/2010 |
| WO | WO 2013/080938 A1 | 6/2013 |
| WO | WO 2014/054919 A1 | 4/2014 |
| WO | WO 2014/136799 A1 | 9/2014 |
| WO | 2015/008626 A1 | 1/2015 |
| WO | WO 2015/046191 A1 | 4/2015 |
| WO | WO 2015/076571 A1 | 5/2015 |
| WO | WO 2015/122322 A1 | 8/2015 |

(56) References Cited

FOREIGN PATENT DOCUMENTS

| WO | WO 2018/147714 A1 | 8/2018 |
|---|---|---|
| WO | WO 2018/155345 A1 | 8/2018 |

OTHER PUBLICATIONS

European Search Report for EP 19902841.6 dated Aug. 12, 2022, 12 pages.
International Search Report for corresponding Application No. PCT/KR2019/009136 dated Oct. 30, 2019, 4pp.
International Search Report for corresponding Application No. PCT/KR2019/010129 dated Nov. 28, 2019, 4pp.
Chang, Song, et al., "A review of functional separator for improving the flammability of lithium-sulfur batteries," The Chinese Journal of Process Engineering, vol. 18 S1, Nov. 2018, 10 pages.
Li, Xia, et al., "Derivatives of Acrylamide and Their Application," Fine and Specialty Chemicals, vol. 13, No. 24, Dec. 2005, 5 pages.
Liu, Meihua, et al., "Enhancement on the thermostability and wettability of lithium-ion batteries separator via surface chemical modification," Materials Letters, vol. 208, 2017, pp. 98-101.
Chinese Notice of Allowance, with English translation, dated Aug. 30, 2023, issued in Chinese Patent Application No. 201980084182.6 (8 pages).
Technical Data Sheet of Boeh mite 200SM by Nalbatec AG, retrieved from https://nabaltec.de/en/products/boehmite/ (Year: 2023).
Technical Data Sheet of Boeh mite AOH 60 by Nalbatec AG, retrieved from https://nabaltec.de/en/products/boehmite/ (Year: 2023).
US Office Action dated Dec. 1, 2023, issued in U.S. Appl. No. 17/297,373 (pages).
International Search Report for corresponding Application No. PCT/KR2019/009945 dated Nov. 20, 2019, 4pp.
Limparyoon, Nattawut, et al., "Acrylamide/2-acrylamido-2-methylpropane sulfonic acid and associated sodium salt superabsorbent copolymer nanocomposites with mica as fire retardants", Polymer Degradation and Stability, vol. 96, No. 6, pp. 1054-1063, 2011.
Chinese Office Action for CN Appl. 201980084182.6 dated May 31, 2023, 19 pgs.
EPO Extended European Search Report dated Dec. 20, 2022, issued in European Patent Application No. 19902175.9 (8 pages).
"Derive." New Oxford American Dictionary. Eds. Stevenson, Angus, and Christine A. Lindberg. : Oxford University Press, 2011. Oxford Reference. Date Accessed Aug. 10, 2023, https://www.oxfordreference.com/view/10.1093/acref/9780195392883.001.0001/m_en_us1239627. (Year: 2011).
Chinese Decision of Rejection, with English translation, dated Jul. 1, 2023, issued in Chinese Patent Application No. 201980085911.X (21 pages).
Chinese Notice of Allowance, with English translation, dated Jan. 13, 2023, issued in Chinese Patent Application No. 201980055198.4 (8 pages).
Chinese Office Action, with English translation, dated Apr. 13, 2023, issued in corresponding Chinese Patent Application No. 201980083245.6 (6 pages).
Chinese Office Action, with English translation, dated Apr. 23, 2023, issued in Chinese Patent Application No. 201980085835.2 (15 pages).
Chinese Office Action, with English translation, dated Aug. 12, 2023, issued in Chinese Patent Application No. 201980082244.X (13 pages).
Chinese Office Action, with English translation, dated Aug. 3, 2022, issued in Chinese Patent Application No. 201980055198.4 (20 pages).
Chinese Office Action, with English translation, dated Jun. 22, 2023, issued in Chinese Patent Application No. 201980087908.1 (23 pages).
Chinese Office Action, with English translation, dated Oct. 24, 2022, issued in Chinese Patent Application No. 201980087908.1 (18 pages).
Chinese Office Action, with English translation, dated Sep. 20, 2022, issued in corresponding Chinese Patent Application No. 201980083245.6 (28 pages).
Chinese Office Action, with English translation, dated Sep. 30, 2022, issued in Chinese Patent Application No. 201980085835.2 (15 pages).
EPO Extended European Search Report dated Aug. 3, 2022, issued in corresponding European Patent Application No. 19898125.0 (11 pages).
EPO Extended European Search Report dated Dec. 6, 2022, issued in European Patent Application No. 19910153.6 (9 pages).
EPO Extended European Search Report dated May 17, 2022, issued in European Patent Application No. 19861770.6 (10 pages).
EPO Extended European Search Report dated Oct. 14, 2022, issued in European Patent Application No. 19904249.0 (9 pages).
EPO Third Party Observations dated Sep. 21, 2021, issued in European Patent Application No. 19861770.6 (20 pages).
Ghosh, Prof. Premamoy, "Polymer Science Fundamentals of Polymer Science: Molecular Weights of Polymers," Sep. 2006, XP055608363, 22 pages.
International Search Report for Application No. PCT/KR2019/008767 dated Oct. 25, 2019, 4pp.
International Search Report for Application No. PCT/KR2019/009085 dated Oct. 30, 2019, 4pp.
International Search Report for Application No. PCT/KR2019/010130 dated Nov. 26, 2019, 4pp.
International Search Report for corresponding Application No. PCT/KR2019/010128 dated Nov. 26, 2019, 6pp.
Japanese Office Action dated Jun. 20, 2022, issued in Japanese Patent Application No. 2021-513921 (6 pages).
Notification of Third Party Observation dated Jun. 6, 2022, 15 pages.
US Final Office Action dated Aug. 18, 2023, issued in U.S. Appl. No. 17/414,043 (19 pages).
US Final Office Action dated Sep. 25, 2023, issued in U.S. Appl. No. 17/296,501 (26 pages).
US Office Action dated Jun. 14, 2023, issued in U.S. Appl. No. 17/296,501 (29 pages).
US Office Action dated May 2, 2023, issued in U.S. Appl. No. 17/414,043, 19 pages.
Chinese Office Action, with English translation, dated Mar. 8, 2023, issued in Chinese Patent Application No. 201980085911.X (20 pages).
Chinese Office Action, with English translation, dated Apr. 3, 2023, issued in Chinese Patent Application No. 201980087928.9 (28 pages).
Chinese Office Action, with English translation, dated Apr. 20, 2023, issued in Chinese Patent Application No. Cn 201980082244.X (13 pages).
International Search Report for Application No. PCT/KR2019/010131 dated Nov. 28, 2019, 4 pp.
Chinese Office Action for CN Application No. 201980082244.X dated Sep. 26, 2022, 14 pages.
Chinese Office Action for CN Application No. 201980084182.6 dated Sep. 29, 2022, 16 pages.
Chinese Office Action for CN Application No. 201980085911.X dated Oct. 8, 2022, 21 pages.
Chinese Office Action for CN Application No. 201980087928.9 dated Oct. 9, 2022, 21 pages.
European Search Report for EP 19906911.3 dated Oct. 14, 2022, 7 pages.
Fedelich, "Application Handbook Thermal Analysis of Polymers Selected Applications Thermal Analysis", Jan. 1, 2013, XP055608279, Retrieved from the Internet: URL: https://www.mt.com/dam/LabDiv/guides-glen/ta-polymer/TA_Polymers_Selected_Apps_EN.pdf [retrieved on Jul. 24, 2019], 40 pgs.
Ghosh, "Polymer Science Fundamentals of Polymer Science Molecular Weights of Polymers Contents Introduction Concept of Average Molecular Weight Number Average Molecular Weight Membrane Osmometry Weight Average Molecular Weight Assessment of Shape of Polymer Molecules Viscosity Average Molecular Weight Gener", Sep. 21, 2006, XP055608363, 22 pgs.

(56) References Cited

OTHER PUBLICATIONS

US Office Action dated Mar. 28, 2024, issued in U.S. Appl. No. 17/296,528 (7 pages).
JP 2020087591—Translation, 20 pages.
WO 2015046191—Translation, 17 pages.
US Notice of Allowance dated Jan. 24, 2024, issued in U.S. Appl. No. 17/296,528 (11 pages).
US Final Office Action dated Mar. 6, 2024, issued in U.S. Appl. No. 17/297,373 (9 pages).
US Office Action dated Jun. 20, 2024, issued in U.S. Appl. No. 17/416,686 (19 pages).
US Final Office Action dated Oct. 24, 2024, issued in U.S. Appl. No. 17/296,528 (10 pages).
EPO Office Action dated Nov. 28, 2024, issued in corresponding European Patent Application No. 19898811.5 (4 pages).

\* cited by examiner

SEPARATOR FOR LITHIUM SECONDARY BATTERY AND LITHIUM SECONDARY BATTERY COMPRISING SAME

CROSS-REFERENCE TO RELATED APPLICATIONS

This application is a U.S. National Phase Patent Application of International Application Number PCT/KR2019/009945, filed on Aug. 8, 2019, which claims priority to Korean Patent Application Number 10-2018-0166512, filed on Dec. 20, 2018, the entire content of both of which is incorporated herein by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

For example, a method of increasing heat resistance of the separator by coating the separator with a mixture of inorganic particles having a large heat resistance and an organic binder having adherence is well known. However, this conventional method may not sufficiently secure desired adherence and not uniformly applied to variously-sized separators.

DISCLOSURE

A separator for a lithium secondary battery having high heat resistance, strong adhesive strength, withstand voltage characteristics, and moisture resistance, and a lithium secondary battery including the same are provided.

In an embodiment, a separator for a lithium secondary battery includes a porous substrate, and a coating layer on at least one surface of the porous substrate, wherein the coating layer includes a (meth)acrylic copolymer including a first structural unit derived from (meth)acrylamide, a second structural unit derived from (meth)acrylonitrile, and a third structural unit including at least one of structural units derived from (meth)acrylamidosulfonic acid, a (meth)acrylamidosulfonic acid salt, or a combination thereof; inorganic particles; and an organic filler, and the organic filler is included in an amount of 0.1 wt % to 50 wt % based on a total amount of the organic filler and the inorganic particles.

A volume ratio of the inorganic particles and the organic filler may be 40:1 to 1:3.

A weight ratio of the (meth)acrylic copolymer:the sum amount of the organic filler and the inorganic particles may be 1:20 to 1:40.

The organic filler may have an average particle diameter of 0.1 to 0.5 µm.

The inorganic particles may have an average particle diameter of 0.3 to 0.7 µm.

The organic filler may be at least one organic compound selected from a (meth)acrylate-based compound and a derivative thereof, a diallyl phthalate-based compound and a derivative thereof, a polyimide-based compound and a derivative thereof, a copolymer thereof, and a mixture thereof.

The inorganic particles may include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

The (meth)acrylic copolymer may have a glass transition temperature of 130 to 160° C.

The first structural unit may be included in an amount of 55 to 90 mol % based on 100 mol % of the (meth)acrylic copolymer and the second structural unit and third structural unit may each independently be included in an amount of 5 to 40 mol % based on 100 mol % of the (meth)acrylic copolymer.

The second structural unit derived from (meth)acrylonitrile may be included in an amount of 5 to 40 mol % based on 100 mol % of the (meth)acrylic copolymer and the third structural unit derived from (meth)acrylamidosulfonic acid, (meth)acrylamidosulfonic acid salt, or a combination thereof may be included in an amount of 5 to 10 mol % based on 100 mol % of the (meth)acrylic copolymer.

The first structural unit derived from (meth)acrylamide may be included in an amount of 80 to 85 mol % based on 100 mol % of the (meth)acrylic copolymer, the second structural unit derived from (meth)acrylonitrile may be included in an amount of 10 to 15 mol % based on 100 mol % of the (meth)acrylic copolymer, and the third structural unit derived from (meth)acrylamidosulfonic acid, (meth) acrylamidosulfonic acid salt, or a combination thereof may be included in an amount of 5 to 10 mol % based on 100 mol % of the (meth)acrylic copolymer.

The first structural unit derived from (meth)acrylamide may be represented by Chemical Formula 1, the second structural unit derived from (meth)acrylonitrile may be represented by Chemical Formula 2, and the third structural unit derived from (meth)acrylamidosulfonic acid, (meth) acrylamidosulfonic acid salt, or a combination thereof may be represented by one of Chemical Formula 3, Chemical Formula 4, Chemical Formula 5, and a combination thereof:

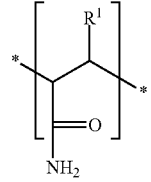

[Chemical Formula 1]

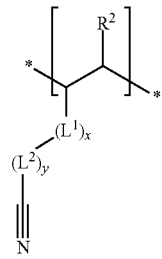

[Chemical Formula 2]

[Chemical Formula 3]

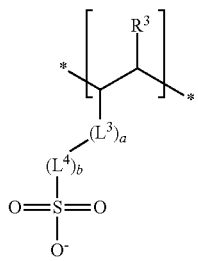

[Chemical Formula 4]

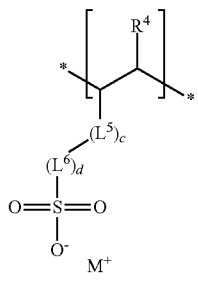

[Chemical Formula 5]

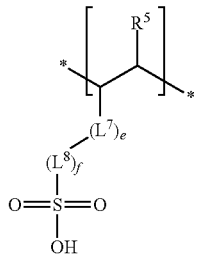

In Chemical Formula 1 to Chemical Formula 5, $R^1$ is hydrogen or a methyl group, $R^2$, $R^3$, $R^4$, and $R^5$ are each independently hydrogen or a C1 to C3 alkyl group, $L^1$, $L^3$, $L^5$, and $L^7$ are each independently —C(=O)—, —C(=O)O—, —OC(=O)—, —O—, or —C(=O)NH—, $L^2$, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x and y are each independently an integer of 0 to 2, a, b, c, d, e, and f are each independently an integer of 0 to 2, and $M^+$ is an alkali metal.

The (meth)acrylic copolymer may have a weight average molecular weight of 200,000 to 700,000.

The (meth)acrylic copolymer may be included in an amount of 1 wt % to 5 wt % based on a total amount of the coating layer.

The coating layer may have a thickness of 1 to 5 μm.

Another embodiment provides a lithium secondary battery including a positive electrode, a negative electrode, and the separator for a lithium secondary battery between the positive electrode and the negative electrode.

A lithium secondary battery including a separator for a lithium secondary battery having excellent heat resistance and adherence and enhanced withstand voltage characteristics, and moisture resistance may be implemented.

MODE FOR INVENTION

Figure 1:
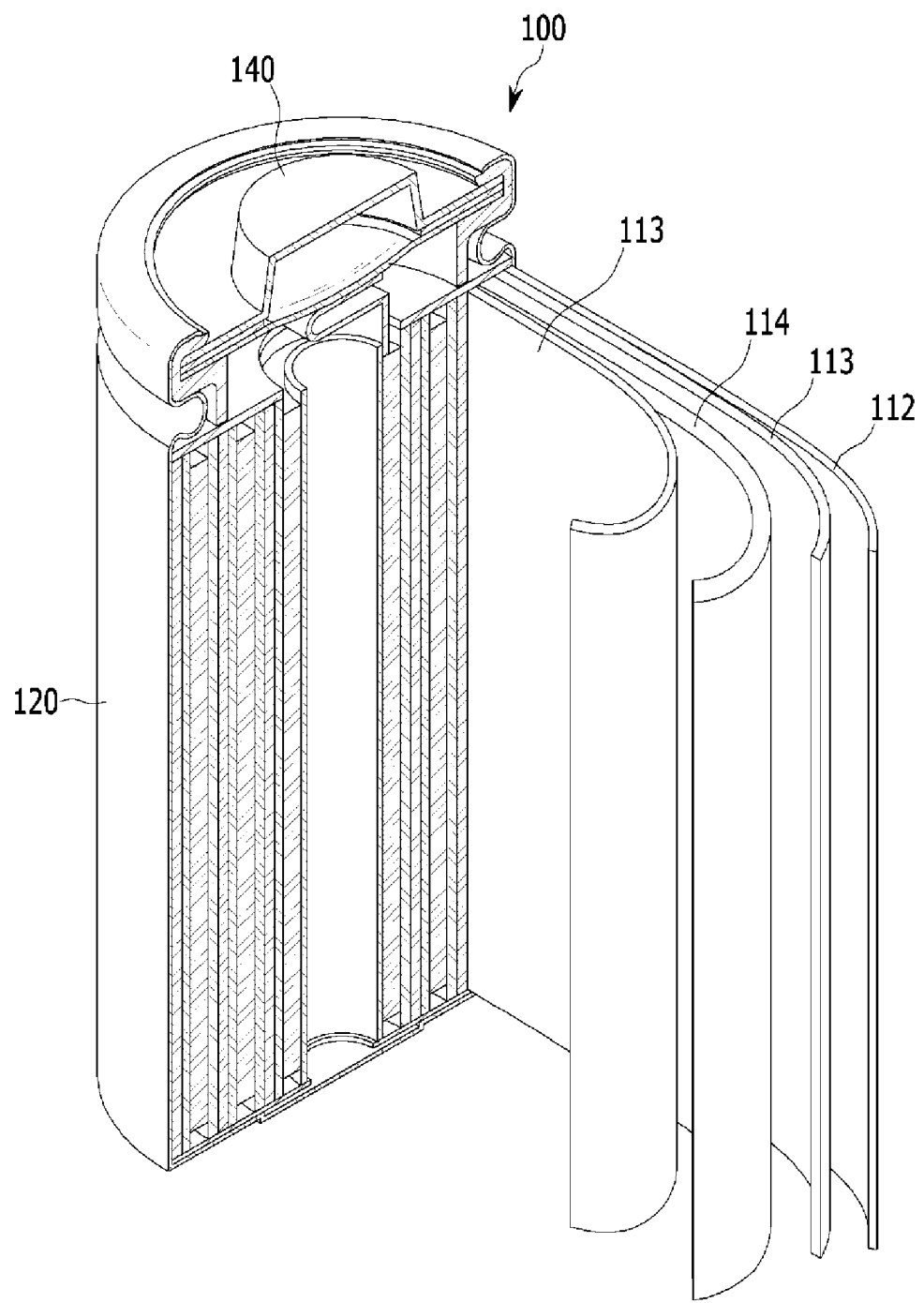
FIG. 1 is an exploded perspective view of a rechargeable lithium battery according to an embodiment.

Hereinafter, embodiments of the present invention are described in detail. However, these embodiments are exemplary, the present invention is not limited thereto and the present invention is defined by the scope of claims.

In the present specification, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, "hetero" refers to one including 1 to 3 heteroatoms selected from N, O, S, and P.

In addition, in the present specification, when a definition is not otherwise provided, "heterocyclic group" refers to a substituted or unsubstituted C3 to C20 heterocycloalkylene group or a substituted or unsubstituted C6 to C20 heteroarylene group.

In addition, in the present specification, "(meth)acrylic" refers to acrylic or methacrylic.

A separator for a lithium secondary battery according an embodiment includes a porous substrate; and a coating layer on at least one surface or both surfaces of the porous substrate.

The porous substrate may have a plurality of pore and may generally be a porous substrate used in an electrochemical device. Non-limiting examples of the porous substrate may be a polymer film formed of a polymer selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, polyphenylene oxide, a cyclic olefin copolymer, polyphenylene sulfide, polyethylene naphthalate, a glass fiber, Teflon, and polytetrafluoroethylene, or a copolymer or a mixture of two or more.

The porous substrate may be for example a polyolefin-based substrate, and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 to 40 μm, for example 1 to 30 μm, 1 to 20 μm, 5 to 15 μm, or 10 to 15 μm.

The coating layer according to an embodiment may be present on one surface of the substrate in contact with the positive electrode, on one surface of the substrate in contact with the negative electrode, or on both surfaces of the substrate in order to bind of the electrode and the separator. Accordingly, the interface resistance between the electrode and the separator may be reduced, and adherence of the separator may be improved.

The coating layer according to an embodiment includes a (meth)acrylic copolymer including a first structural unit derived from (meth)acrylamide, a second structural unit derived from (meth)acrylonitrile, and a third structural unit derived from (meth)acrylamidosulfonic acid, (meth)acrylamidosulfonic acid salt, or a combination thereof.

The first structural unit derived from (meth)acrylamide includes an amide functional group (—$NH_2$) in the structural unit. The —$NH_2$ functional group may improve the adhesion properties of the porous substrate to the electrode, and by forming a hydrogen bond with the —OH functional group of the inorganic particles described later, the inorganic particles may be more firmly fixed in the coating layer and thus heat resistance may be enhanced.

The second structural unit derived from the (meth)acrylonitrile includes a nitrile group, thereby improving oxidation resistance of the separator and reducing the moisture content.

The third structural unit derived from (meth)acrylamidosulfonic acid, a (meth)acrylamidosulfonic acid salt, or a combination thereof includes a bulky functional group, thereby reducing the mobility of the (meth)acrylic copolymer, the heat resistance of the separator may be enhanced.

The coating layer disposed on the separator for a lithium secondary battery according to an embodiment may include an organic filler and inorganic particles along with the aforementioned (meth)acrylic copolymer, thereby enhancing withstand voltage characteristics. In particular, as a portion of the volume occupied by the inorganic particles is replaced with an organic filler, an increase in the moisture content proportional to the specific surface area of the inorganic particles is suppressed, thereby contributing to improvement of cell cycle-life characteristics.

The organic filler included in the separator for a lithium secondary battery according to an embodiment is included in an amount of 0.1 to 50 wt % based on the total amount of the organic filler and the inorganic particles. When the content of the organic filler is within the above range, excellent heat resistance may be secured.

For example, the organic filler may be included in an amount of 1 wt % to 50 wt %, 3 wt % to 50 wt %, or 5 wt % to 50 wt % based on the total amount of the organic filler and the inorganic particles. For example, the organic filler may be included in an amount of greater than or equal to 5 wt %, greater than or equal to 10 wt %, or greater than or equal to 20 wt %, and less than or equal to 50 wt %, less than or equal to 45 wt %, less than or equal to 40 wt %, less than or equal to 35 wt %, less than or equal to 30 wt %, or less than or equal to 25 wt % based on the total amount of the organic filler and the inorganic particles, but is not limited thereto.

For example, a volume ratio of the inorganic particles and the organic filler may be 40:1 to 1:3, for example, 30:1 to 1:2, 20:1 to 1:2, 10:1 to 1:2, 4:1 to 1:2, or 3:1 to 1:1. As the inorganic particles are replaced with the organic filler in the above ratios, the adhesive strength to the substrate and the withstand voltage characteristics are improved, and the effect of suppressing the increase in moisture content may be maximized.

The coating layer may include the (meth)acrylic copolymer: the sum amount of the organic filler and the inorganic particles in a weight ratio of 1:20 to 1:40, for example, 1:25 to 1:40 or 1:25 to 1:35. When the (meth)acrylic copolymer and inorganic particles are included in the above range in the coating layer, the separator may exhibit excellent heat resistance and air permeability.

The average particle diameter of the organic filler may be 0.1 to 0.5 μm, for example 0.1 to 0.3 μm, for example 0.2 to 0.4 μm. When an organic filler having an average particle diameter within the above range is used, a separator having excellent heat resistance may be provided by imparting excellent strength to the coating layer.

The organic filler may be at least one organic compound selected from a (meth)acrylate-based compound and a derivative thereof, a diallyl phthalate-based compound and a derivative thereof, a polyimide-based compound and a derivative thereof, a copolymer thereof, and a mixture thereof.

The organic filler may be specifically obtained through the following methods.

After dispersing the (meth)acrylate-based compound in an emulsifier, a trace amount of an aqueous copper sulfate solution is added thereto, and then a redox polymerization initiator is added thereto, followed by emulsion polymerization to obtain the organic filler.

Further, the organic filler may be obtained by polymerizing the diallyl phthalate-based compound in the presence of a water-soluble polymerization initiator.

In addition, the organic filler may be obtained by reacting an aldehyde-based compound with emulsion particles composed of a core part made of a hydrophobic polymer and a shell part made of a hydrophilic polymer. At this time, the hydrophobic polymer has a glass transition temperature of greater than or equal 20° C. and an acetoacetyl group, and the hydrophilic polymer has a functional group capable of being dispersed in water.

In addition, an organic filler may be obtained as follows: after preparing a polyimide fine particle dispersion in which the polyamic acid fine particles dispersed in a hydrophilic solvent are imidized with acetic anhydride, pyridine, etc., the hydrophilic solvent is removed by centrifugation, and then an aqueous surfactant solution is added to the remaining by-products to replace water to obtain the organic filler.

More specifically, the organic filler may have a highly crosslinked structure.

In an embodiment, the organic filler may be a polymer material such as an acrylate-based or methacrylate-based polymer or copolymer. In this case, the glass transition temperature of the polymer may be controlled by adjusting the monomer ratio of the polymer or copolymer. For example, an acrylate-based or methacrylate-based polymer or copolymer having a glass transition temperature of 30 to 90° C. can be used. However, the present invention is not limited thereto.

The inorganic particles may prevent a separator from being sharply shrunk due to a temperature increase. The inorganic particles may be a ceramic material capable of improving heat resistance, for example, $Al_2O_3$, $SiO_2$, $TiO_2$, $SnO_2$, $CeO_2$, $MgO$, $NiO$, $CaO$, $GaO$, $ZnO$, $ZrO_2$, $Y_2O_3$, $SrTiO_3$, $BaTiO_3$, $Mg(OH)_2$, boehmite, or a combination thereof, but are not limited thereto. The inorganic particles may have a spherical shape, a sheet shape, a cubic shape, or an amorphous shape. The inorganic particles may have an average particle diameter of 0.3 to 0.7 μm, for example 0.4 to 0.7 μm, for example 0.5 to 0.7 μm.

The average particle diameter of the inorganic particles may be particle size ($D_{50}$) at a volume ratio of 50% in a cumulative size-distribution curve. By using the inorganic particles having an average particle diameter within the ranges, the coating layer may have an appropriate strength, thereby improving heat resistance, durability, and stability of the separator.

The organic filler and inorganic particles may be included in an amount of 50 wt % to 99 wt % based on the total amount of the coating layer. In an embodiment, the organic filler and inorganic particles may be included in an amount of 70 wt % to 99 wt %, for example, 80 wt % to 99 wt %, 85 to 99 wt %, 90 to 99 wt %, or 95 to 99 wt % based on a total amount of the coating layer. When the organic filler and inorganic particles are included in the above ranges, the separator for a lithium secondary battery according to an embodiment may exhibit excellent heat resistance, durability, and stability.

The first structural unit may be included in an amount of 55 to 90 mol %, for example 55 to 85 mol % based on 100 mol % of the (meth)acrylic copolymer.

The second structural unit may be included in an amount of 5 to 40 mol %, for example, greater than or equal to 5 mol %, greater than or equal to 10 mol %, greater than or equal to 15 mol %, or greater than or equal to 20 mol %, and less than or equal to 40 mol %, less than or equal to 35 mol %, or less than or equal to 30 mol % based on 100 mol % of the (meth)acrylic copolymer.

The third structural unit may be included in an amount of 5 to 40 mol %, for example greater than or equal to 5 mol % or greater than or equal to 10 mol % and less than or equal to 40 mol %, less than or equal to 35 mol %, less than or equal to 30 mol %, less than or equal to 25 mol %, less than or equal to 20 mol %, less than or equal to 15 mol %, or less than or equal to 13 mol % based on 100 mol % of the (meth)acrylic copolymer.

For example, the first structural unit derived from (meth) acrylamide may be included in an amount of 80 to 85 mol % based on 100 mol % of the (meth)acrylic copolymer, the second structural unit derived from (meth)acrylonitrile may be included in an amount of 10 to 15 mol % based on 100 mol % of the (meth)acrylic copolymer, and the third structural unit derived from the (meth)acrylamidosulfonic acid, (meth)acrylamidosulfonic acid salt, or combination thereof may be included in an amount of 5 to 10 mol % based on 100 mol % of the (meth)acrylic copolymer.

When the content of each structural unit is within the above range, heat resistance and adhesive strength of the separator may be further improved.

The first structural unit derived from the (meth)acrylamide may be, for example, represented by Chemical Formula 1.

[Chemical Formula 1]

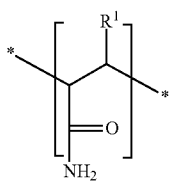

In Chemical Formula 1, $R^1$ is hydrogen or a C1 to C6 alkyl group.

The second structural unit derived from the (meth)acrylonitrile may be represented by Chemical Formula 2.

[Chemical Formula 2]

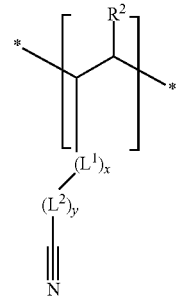

In Chemical Formula 2, $R^2$ is hydrogen or C1 to C3 alkyl group, $L^1$ is —C(=O)—, —C(=O)O—, —OC(=O)—, —O—, or —C(=O)NH—, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and x and y are each independently an integer of 0 to 2.

The second structural unit derived from the (meth)acrylonitrile may be, for example, a structural unit derived from (meth)acrylonitrile or cyanoalkyl (meth)acrylate. Herein, the alkyl may be a C1 to C20 alkyl, a C1 to C10 alkyl, or a C1 to C6 alkyl.

The cyanoalkyl (meth)acrylate may be, for example, cyanomethyl (meth) acrylate, cyanoethyl (meth) acrylate, cyanopropyl (meth) acrylate, or cyanooctyl (meth) acrylate.

The third structural unit derived from the (meth)acrylamidosulfonic acid, (meth)acrylamidosulfonic acid salt, or a combination thereof may be a structural unit derived from (meth)acrylamidosulfonic acid or (meth)acrylamidosulfonate and the (meth)acrylamidosulfonate may be a conjugate base of (meth)acrylamidosulfonic acid, (meth)acrylamidosulfonic acid salt, or a derivative thereof. The structural unit derived from the (meth)acrylamidosulfonic acid or (meth)acrylamidosulfonate may be, for example, represented by one of Chemical Formula 3, Chemical Formula 4,

[Chemical Formula 3]

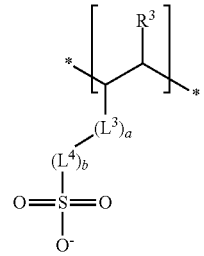

-continued

[Chemical Formula 4]

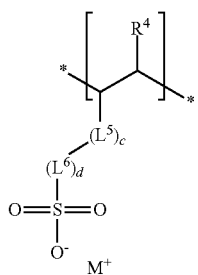

[Chemical Formula 5]

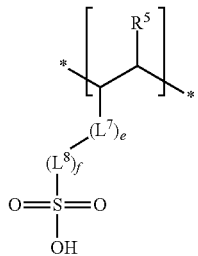

In Chemical Formula 3 to Chemical Formula 5, $R^3$, $R^4$, and $R^5$ are each independently hydrogen or a C1 to C3 alkyl group, $L^3$, $L^5$, and $L^7$ are each independently —C(=O)—, —C(=O)O—, —OC(=O)—, —O—, or —C(=O)NH—, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, c, d, e, and f are each independently an integer of 0 to 2, and M is an alkali metal, wherein the alkali metal may be, for example, lithium, sodium, potassium, rubidium, or cesium.

For example, in Chemical Formula 3 to Chemical Formula 5, $L^3$, $L^5$, and $L^7$ may all be —C(=O)NH—, $L^4$, $L^6$, and $L^8$ may each independently be a substituted or unsubstituted C1 to C10 alkylene, and a, b and c may each be 1.

The third structural unit derived from the (meth)acrylamidosulfonic acid, (meth)acrylamidosulfonic acid salt, or a combination thereof may include each of the structural unit represented by Chemical Formula 3, the structural unit represented by Chemical Formula 4, or the structural unit represented by Chemical Formula 5, or may include two or more types thereof together. As one example, the structural unit represented by Chemical Formula 4 may be included, and as another example, the structural unit represented by Chemical Formula 4 and the structural unit represented by Chemical Formula 5 may be included together.

When the structural unit represented by Chemical Formula 4 and the structural unit represented by Chemical Formula 5 are included together, the structural unit represented by Chemical Formula 4 and the structural unit represented by Chemical Formula 5 may be included in a mole ratio of 10:1 to 1:2, for example 5:1 to 1:1, or 3:1 to 1:1.

The sulfonate group in the third structural unit derived from the (meth)acrylamidosulfonic acid, (meth)acrylamidosulfonic acid salt, or a combination thereof may be, for example, a functional group derived from vinyl sulfonic acid, allyl sulfonic acid, styrene sulfonic acid, anethiol sulfonic acid, acrylamidoalkane sulfonic acid, sulfoalkyl (meth)acrylate, or a salt thereof.

Herein, the alkane may be a C1 to C20 alkane, a C1 to C10 alkane, or a C1 to C6 alkane, and the alkyl may be a C1 to C20 alkyl, a C1 to C10 alkyl, or a C1 to C6 alkyl. The salt refers to a salt composed of the aforementioned sulfonic acid and appropriate ions. The ions may be, for example, alkali metal ions, and in this case, the salt may be an alkali metal sulfonate salt.

The acrylamidoalkane sulfonic acid may be, for example, 2-acrylamido-2-methylpropane sulfonic acid and the sulfoalkyl (meth)acrylate may be, for example, 2-sulfoethyl (meth)acrylate, 3-sulfopropyl (meth)acrylate, and the like.

The (meth)acrylic copolymer may be represented by Chemical Formula 6.

[Chemical Formula 6]

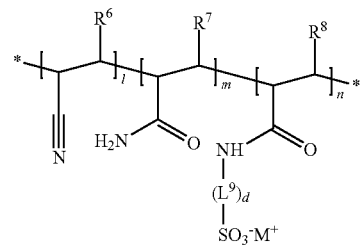

In Chemical Formula 6, $R^6$ to $R^8$ are each independently hydrogen or a methyl group, $L^9$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, d is one of integers of 0 to 2, M is an alkali metal such as lithium, sodium, potassium, rubidium, cesium, and the like, and l, m, and n indicate mole ratios of each unit.

For example, in Chemical Formula 6, l+m+n may be 1. In addition, for example, it may be $0.1 \le (l+n) \le 0.45$, $0.55 \le m \le 0.90$, specifically $0.05 \le l \le 0.40$, and $0.05 \le n \le 0.40$, for example $0.80 \le m \le 0.85$, $0.1 \le l \le 0.15$, and $0.05 \le n \le 0.1$.

The structural unit in which the alkali metal ($M^+$) is substituted in the (meth)acrylic copolymer may be present in an amount of 50 to 100 mol %, for example 60 to 90 mol %, or 70 to 90 mol % based on 100 mol % of the total amount of the (meth)acrylamidosulfonic acid structural unit. When the above substitution degree of the alkali metal is satisfied, the (meth)acrylic copolymer and the separator including the same may exhibit excellent adherence, heat resistance, and oxidation resistance.

The (meth)acrylic copolymer may further include other structural units in addition to the structural units described above. For example, the (meth)acrylic copolymer may further include a structural unit derived from an alkyl (meth)acrylate, a structural unit derived from a diene-based compound, a structural unit derived from a styrene-based compound, a structural unit containing an ester group, a structural unit containing a carbonate group, or a combination thereof.

The (meth)acrylic copolymer may be in various forms, such as an alternating polymer in which the structural units are alternately distributed, a random polymer randomly distributed, or a graft polymer in which some structural units are grafted.

The weight average molecular weight of the (meth)acrylic copolymer may be 200,000 to 700,000, for example 300,000 to 600,000, 350,000 to 550,000 or 400,000 to 500,000. When the weight average molecular weight of the (meth) acrylic copolymer satisfies the above ranges, the (meth)

acrylic copolymer and a separator including the (meth)acrylic copolymer may have excellent adherence, heat resistance, and air permeability.

The weight average molecular weight may be polystyrene-reduced average molecular weight measured by gel permeation chromatography.

The (meth)acrylic copolymer may be prepared by various methods such as emulsion polymerization, suspension polymerization, massive polymerization, solution polymerization, or bulk polymerization.

The (meth)acrylic copolymer may have a glass transition temperature of 130 to 160° C., for example 135 to 160° C., 140 to 160° C., or 145 to 160° C. When the glass transition temperature of the (meth)acrylic copolymer falls within the above ranges, the (meth)acrylic copolymer and a separator including the same may have excellent adherence, heat resistance, and air permeability.

The (meth)acrylic copolymer may be included in an amount of 1 to 5 wt %, for example, 2 to 4 wt % based on a total amount of the coating layer. When the (meth)acrylic copolymer is included in the weight ratio, a separator having excellent adhesive strength, heat resistance, and air permeability can be obtained.

Meanwhile, the coating layer may further include a crosslinked binder having a crosslinked structure in addition to the (meth)acrylic copolymer. The crosslinked binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, but is not limited thereto.

The crosslinked binder may be for example, obtained by curing a monomer, an oligomer and/or a polymer including at least two (meth)acrylate groups, and may be for example obtained by curing ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri (meth)acrylate, pentaerythritol tetra(meth)acrylate, diglycerine hexa(meth)acrylate, or a combination thereof.

For example, the crosslinked binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the crosslinked binder may be obtained from a monomer, an oligomer and/or a polymer including at least two isocyanate groups, for example diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyl-diphenyl-4,4'-diisocyanate, xylene diisocyanate, naphthalene diisocyanate, 1,4-cyclohexyl diisocyanate, or a combination thereof.

In addition, the coating layer may further include a non-crosslinked binder in addition to the (meth)acrylic copolymer. The non-crosslinked binder may be for example a vinylidenefluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived unit or a copolymer of a vinylidene fluoride-derived unit and other monomer-derived unit. The copolymer may specifically include a vinylidene fluoride-derived unit and at least one of units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived unit and a hexafluoropropylene monomer-derived unit.

For example, the non-crosslinked binder may be a polyvinylidene fluoride (PVdF) homopolymer, a polyvinylidene fluoride-hexafluoropropylene (PVdF-HFP) copolymer, or a combination thereof. In this case, adherence between the porous substrate and the coating layer is increased, stability of the separator and impregnation properties of an electrolyte solution are improved, and thus high-rate charge and discharge characteristics of a battery is improved.

The coating layer may have a thickness of about 1 to 5 μm, for example 1.5 to 3 μm.

A ratio of a thickness of the coating layer to a thickness of the porous substrate may be 0.05 to 0.5, for example 0.05 to 0.4, or 0.05 to 0.3, or 0.1 to 0.2. In this case, the separator including the porous substrate and the coating layer may exhibit excellent air permeability, heat resistance, and adherence.

The separator for a lithium secondary battery according to an embodiment has excellent heat resistance. Specifically, the separator may have a shrinkage rate of less than 10% or less than or equal to 5% at high temperature. For example, after the separator is left at 150° C. for 60 minutes, the shrinkage rates in the vertical direction and the transverse direction of the separator may be less than 10%, or less than or equal to 5%, respectively.

The separator for a lithium secondary battery according to an embodiment may exhibit excellent air permeability, and specifically less than 160 sec/100 cc·1 μm, for example less than or equal to 150 sec/100 cc·1 μm, or less than or equal to 140 sec/100 cc·1 μm per unit thickness. Herein, the air permeability refers to the time (seconds) it takes for 100 cc of air to pass through the unit thickness of the separator. The air permeability per unit thickness may be obtained by measuring the air permeability for the total thickness of the separator and dividing it by the thickness.

The separator for a lithium secondary battery according to an embodiment may be manufactured by known various methods. For example, the separator for a lithium secondary battery may be formed by coating a composition for forming a coating layer on one surface or both surfaces of the porous substrate and drying the same.

The composition for forming the coating layer may include the (meth)acrylic copolymer, inorganic particles, and a solvent. The solvent is not particularly limited if the solvent may dissolve the (meth)acrylic copolymer and the inorganic particles. In an embodiment, the solvent may be an aqueous solvent including water, an alcohol, or a combination thereof, which is environmentally-friendly.

The coating may be, for example spin coating, dip coating, bar coating, die coating, slit coating, roll coating, inkjet printing, and the like, but is not limited thereto.

The drying may be for example performed through natural drying, drying with warm air, hot air, or low humid air, vacuum-drying, or radiation of a far-infrared ray, an electron beam, and the like, but the present invention is not limited thereto. The drying may be for example performed at a temperature of 25 to 120° C.

The separator for a lithium secondary battery may be manufactured by lamination, coextrusion, and the like besides the above method.

Another embodiment provides a lithium secondary battery including a positive electrode, a negative electrode, and a separator for a secondary battery between the positive electrode and the negative electrode.

A lithium secondary battery may be classified into a lithium ion battery, a lithium ion polymer battery, and a lithium polymer battery depending on kinds of a separator and an electrolyte and also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a lithium secondary battery, a cylindrical lithium secondary battery is exemplarily described. FIG. 1 is an exploded perspective view of a lithium secondary battery according to an embodiment. Referring to FIG. 1, a lithium secondary battery 100 according to an embodiment includes a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114 and the separator 113, and a battery container 120, a battery case containing the battery cell, and a sealing member 140 that seals the container 120.

The positive electrode 114 may include a positive current collector and a positive active material layer formed on the positive current collector. The positive active material layer includes a positive active material, a binder, and optionally a conductive material.

The positive current collector may use aluminum (Al), nickel (Ni), and the like, but is not limited thereto.

The positive active material may use a compound capable of intercalating and deintercallating lithium. Specifically at least one of a composite oxide or a composite phosphate of a metal selected from cobalt, manganese, nickel, aluminum, iron, or a combination thereof and lithium may be used. For example, the positive active material may be lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, but is not limited thereto.

The negative active material layer may include a negative active material, a binder and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shaped, flake-shaped, spherically, shaped or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ ($0<x<2$), a Si—C composite, a Si—Y alloy, Sn, $SnO_2$, a Sn—C composite, Sn—Y, and the like, and at least one of these may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include two or more selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

Hereinafter, the above aspects of the present invention are illustrated in more detail with reference to examples. However, these examples are exemplary, and the present invention is not limited thereto.

Synthesis Example 1: AM/AN/AMPS=85/10/5, Weight Average Molecular Weight: 410,000, Glass Transition Temperature: 145° C.

Distilled water (6361 g), acrylamide (604.2 g, 8.5 mol), potassium persulfate (2.7 g, 0.01 mol), 2-acrylamido-2-methylpropanesulfonic acid (103.6 g, 0.5 mol) and 5N lithium hydroxide aqueous solution (1.05 equivalent (1.05 g) based on a total amount, 0.5 mol of 2-acrylamido-2-methylpropanesulfonic acid were added to a 10 L four-necked flask equipped with a stirrer, a thermometer, and a cooling tube, an operation of reducing the internal pressure to 10 mmHg with a diaphragm pump and then, returning it to a normal pressure with nitrogen was repeated three times, and then acrylonitrile (53.1 g, 1.0 mol) was added.

The reaction solution was reacted for 12 hours while adjusting the temperature of the reaction solution to be stabilized between 55° C. and 60° C. and cooled to room temperature.

By this method, poly(acrylamide-co-acrylonitrile-co-2-acrylamido-2-methylpropanesulfonic acid) lithium salt was prepared. A mole ratio of acrylamide, acrylonitrile, and 2-acrylamido-2-methylpropanesulfonic acid was 85:10:5. About 10 mL of the reaction solution (reaction product) was taken to measure the non-volatile component, and the result was 9.5% (theoretical value: 10%).

EXAMPLES

Example 1

The acrylic copolymer of Synthesis Example 1 (a binder, a reaction product including 10 wt % of an acrylic copolymer and 90 wt % of distilled water) was added with inorganic particles (0.65 μm, boehmite) milled and dispersed at 25° C. for 30 minutes by using a bead mill and an organic filler (crosslinked polymethylmethacrylate (PMMA), 0.3 μm, Nippon Shokubai Co., Ltd.) in a weight ratio of 95:5 to a water solvent and then, stirred to prepare organic-inorganic dispersion having a weight ratio of acrylic copolymer:the sum amount of inorganic particles and PMMA=1:30. Subsequently, water was added thereto so that a total solid content might be 25 wt % to prepare a composition for a coating layer. The composition was coated to be 2-μm thick on a 8 μm-thick polyethylene porous substrate (air permeability: 120 sec/100 cc, puncture strength: 480 kgf, SK global chemical Co., Ltd.) by a bar-coating method and then, dried at 70° C. for 10 minutes to manufacture a separator for a lithium secondary battery.

Example 2

A separator for a lithium secondary battery was prepared in the same manner as in Example 1, except that the inorganic particles and organic filler were added in a weight ratio of 90:10.

Example 3

A separator for a lithium secondary battery was prepared in the same manner as in Example 1, except that the inorganic particles and organic filler were added in a weight ratio of 80:20.

Example 4

A separator for a lithium secondary battery was prepared in the same manner as in Example 1, except that the inorganic particles and organic filler were added in a weight ratio of 75:25.

Example 5

A separator for a lithium secondary battery was prepared in the same manner as in Example 1, except that the inorganic particles and organic filler were added in a weight ratio of 50:50.

Comparative Example 1

A separator for a lithium secondary battery was prepared in the same manner as in Example 1, except for using 100% of the inorganic particles (boehmite 0.65 μm) which were milled and dispersed at 25° C. for 30 minutes using a bead mill.

Comparative Example 2

A separator for a lithium secondary battery was prepared in the same manner as in Example 1, except that the inorganic particles and organic filler were added in a weight ratio of 40:60.

Comparative Example 3

A separator for a lithium secondary battery was prepared in the same manner as in Example 2, except that polyvinyl alcohol (PVA, weight average molecular weight: 300,000) was used instead of the acrylic copolymer prepared in Synthesis Example 1.

Comparative Example 4

A separator for a lithium secondary battery was prepared in the same manner as in Example 2, except that polyvinylpyrrolidone (PVP, weight average molecular weight: 280,000) was used instead of the acrylic copolymer prepared in Synthesis Example 1.

Comparative Example 5

A separator for a lithium secondary battery was prepared in the same manner as in Example 2, except that carboxymethyl cellulose (CMC, weight average molecular weight: 320,000) was used instead of the acrylic copolymer prepared in Synthesis Example 1.

Comparative Examples 6 to 8

Separators for a lithium secondary battery were prepared in the same manner as in Example 2, except that an acrylic copolymer having the same composition as shown in Table 2 was used.

EVALUATION EXAMPLES

Evaluation Example 1: Measurement of Adhesive Strength to Substrate

The separators according to Examples 1 to 5, and Comparative Examples 1 to 8 were respectively cut into a size having a width of 12 mm and a length of 50 mm to prepare each sample. After adhering a tape to the coating layer surface of each sample, separating the tape-adhered surface from the substrate about 10 mm to 20 mm apart, and then, clipping the substrate having no tape with an upper grip, the coating layer surface adhered with the tape with a lower grip, and fixing a distance between the grips into 20 mm, the coating layer was pulled toward a direction of 180° and peeled off from each separator. Herein, strength for peeling off up to 40 mm at a peeling speed of 10 mm/min was three times measured and averaged. The peeling strength (adhesive strength to the substrate) results are shown in Tables 1 and 2.

Evaluation Example 2: Measurement of Moisture Content

The separators according to Examples 1 to 5 and Comparative Examples 1 to 8 were measured with a moisture content, and the results are shown in Tables 1 and 2. Herein, the moisture content was measured by applying a Karl-Fischer method.

On the other hand, when the moisture content was within a range of 300 ppm to 400 ppm, a cell cycle-life improvement effect was maximized.

Evaluation Example 3: Measurement of Withstand Voltage Characteristics

The separators according to Examples 1 to 5 and Comparative Examples 1 and 2 were measured with respect to a breakdown voltage (BDV), and the results are shown in Table 1. BDV was obtained by placing each separator between SUS plates, fixing a current at 0.3 mA in an AC mode, while a voltage was increased up to 0.3 kV at a boost rate of 8 sec, and then, measuring the voltage where the boost stopped (break, short) by using TOS5301 made by KIKISUI Electronics Corp. BDV of a porous substrate was 1,157 kV.

Evaluation Example 4: Measurement of Heat Shrinkage Rate

The separators for a lithium secondary battery according to Examples 1 to 5 and Comparative Examples 1 to 8 were respectively cut into a size of 8 cm×8 cm to prepare samples. The samples after drawing a 5 cm×5 cm-size quadrangle on the surface were inserted between paper or alumina powder, and then after being left at 150° C. in an oven for 1 hour, the samples were taken out of the oven, and sides of the quadrangles drawn on the samples were measured to calculate each shrinkage rate in machine direction (MD) and in a traverse direction (TD). The results are shown in Tables 1 and 2.

TABLE 1

|  | Inorganic particles: organic filler (weight ratio) | Coating thickness (μ m) | Adhesive strength to the substrate (gf) | Moisture content (ppm) | BDV (kV) | Heat shrinkage rate 150° C., 1 hr (MD/TD) (%) |
|---|---|---|---|---|---|---|
| Example 1 | 95:5 | 2.0 | 9.8 | 375 | 1.243 | 3/3 |
| Example 2 | 90:10 | 2.0 | 10.7 | 348 | 1.289 | 3/2 |
| Example 3 | 80:20 | 2.0 | 14.3 | 324 | 1.326 | 4/3 |
| Example 4 | 75:25 | 2.0 | 15.9 | 318 | 1.368 | 4/3 |
| Example 5 | 50:50 | 2.0 | 21.3 | 283 | 1.487 | 4/4 |
| Comparative Example 1 | 100:0 (inorganic particles alone) | 2.0 | 9.2 | 386 | 1.231 | 3/2 |
| Comparative Example 2 | 40:60 | 2.0 | 7.8 | 229 | 1.503 | 35/45 |

(acrylic copolymer:the sum amount of inorganic particle and organic filler = 1:30 in a weight ratio)

Referring to Table 1, the separators of the examples included a (meth)acrylic copolymer including a specific structural unit and thus exhibited excellent adhesive strength to the substrate and/or withstand voltage characteristics.

In addition, the separators of the examples included the inorganic particles and the organic filler and exhibited excellent moisture characteristics, withstand voltage characteristics, and heat resistance, as a content of the organic filler was increased within the particular range, and thus realized excellent heat resistance and adhesion characteristics.

TABLE 2

|  | Binder (mol % of structural unit) | Adhesive strength to the substrate (gf) | Moisture content (ppm) | Heat shrinkage rate 150° C., 1 hr (MD/TD) (%) |
|---|---|---|---|---|
| Ex. 2 | Acrylic copolymer of Synthesis Example 1 | 10.7 | 348 | 3/2 |
| Comp. Ex. 3 | polyvinyl alcohol (PVA 100) | 8.1 | 432 | 9/10 |
| Comp. Ex. 4 | Polyvinylpyrrolidone (PVP 100) | 7.8 | 446 | 15/13 |
| Comp. Ex. 5 | carboxylmethyl cellulose (CMC 100) | 7.3 | 481 | 11/11 |
| Comp. Ex. 6 | AA 20/CMC 80 | 8.2 | 497 | 10/11 |
| Comp. Ex. 7 | AA 40/CMC 20/VP 40 | 8.6 | 458 | 12/9 |
| Comp. Ex. 8 | AA 100 | 9.5 | 423 | 16/14 |

(Acrylic copolymer, PVA, PVP, or CMC:the sum amount of inorganic particles and organic filler = 1:30 in a weight ratio, In the acrylic copolymer, AA: a structural unit derived from acrylic acid, CMC: a structural unit derived from carboxyl methyl cellulose, VP: a structural unit derived from N-vinyl-pyrrolidone, and V: a structural unit derived from vinyl alcohol)

Referring to Table 2, the separator of Example 2 included the acrylic copolymer including a specific structural unit according to Synthesis Example 1 and thus exhibited improved characteristics in terms of adhesive strength to the substrate, moisture content, and heat shrinkage.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: rechargeable lithium battery
112: negative electrode
113: separator
114: positive electrode
120: battery case
140: sealing member

The invention claimed is:

1. A separator for a lithium secondary battery, comprising a porous substrate and
a coating layer on at least one surface of the porous substrate,
wherein the coating layer comprises a (meth)acrylic copolymer including a first structural unit derived from (meth)acrylamide, a second structural unit derived from (meth)acrylonitrile, and a third structural unit including at least one of structural units derived from (meth)acrylamidosulfonic acid, a (meth)acrylamidosulfonic acid salt, or a combination thereof;
inorganic particles; and
an organic filler;
wherein the organic filler is included in an amount of 5 to 50 wt % based on a total amount of the organic filler and the inorganic particles, and
wherein
the first structural unit derived from (meth)acrylamide is included in an amount of 80 to 85 mol % based on 100 mol % of the (meth)acrylic copolymer,
the second structural unit derived from (meth)acrylonitrile is included in an amount of 10 to 15 mol % based on 100 mol % of the (meth)acrylic copolymer, and
the third structural unit derived from (meth)acrylamidosulfonic acid, (meth)acrylamidosulfonic acid salt, or a combination thereof is included in an amount of 5 to 10 mol % based on 100 mol % of the (meth)acrylic copolymer.

2. The separator of claim 1, wherein a volume ratio of the inorganic particle and the organic filler is 40:1 to 1:3.

3. The separator of claim 1, wherein a weight ratio of the (meth)acrylic copolymer:a sum amount of the organic filler and the inorganic particles is 1:20 to 1:40.

4. The separator of claim 1, wherein an average particle diameter of the organic filler is 0.1 to 0.5 μm.

5. The separator of claim 1, wherein an average particle diameter of the inorganic particles is 0.3 to 0.7 μm.

6. The separator of claim 1, wherein the organic filler is at least one organic compound selected from a (meth)acrylate-based compound and a derivative thereof, a diallyl phthalate-based compound and a derivative thereof, a polyimide-based compound and a derivative thereof, a copolymer thereof, and a mixture thereof.

7. The separator of claim 1, wherein the inorganic particles comprise $Al_2O_3$, $SiO_2$, $TiO_2$, $SnO_2$, $CeO_2$, $MgO$, $NiO$, $CaO$, $GaO$, $ZnO$, $ZrO_2$, $Y_2O_3$, $SrTiO_3$, $BaTiO_3$, $Mg(OH)_2$, boehmite, or a combination thereof.

8. The separator of claim 1, wherein the (meth)acrylic copolymer has a glass transition temperature of 130 to 160° C.

9. The separator of claim 1, wherein
the first structural unit derived from (meth)acrylamide is represented by Chemical Formula 1,
the second structural unit derived from (meth)acrylonitrile is represented by Chemical Formula 2, and
the third structural unit derived from (meth)acrylamidosulfonic acid, (meth)acrylamidosulfonic acid salt, or a combination thereof is represented by one of Chemical Formula 3, Chemical Formula 4, Chemical Formula 5, and a combination thereof:

[Chemical Formula 1]

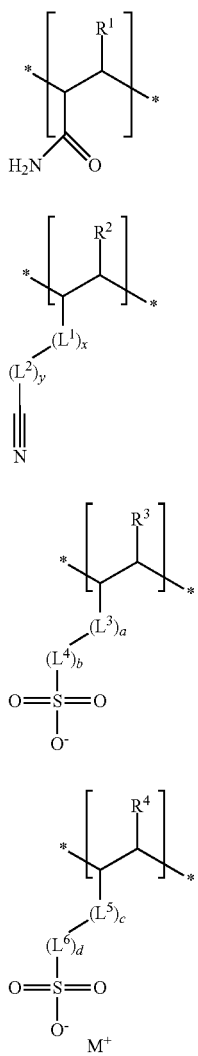

[Chemical Formula 2]

[Chemical Formula 3]

[Chemical Formula 4]

[Chemical Formula 5]

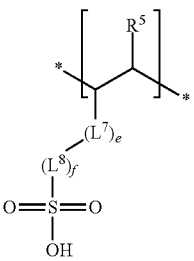

wherein, in Chemical Formula 1 to Chemical Formula 5,
$R^1$ is hydrogen or a methyl group,
$R^2$, $R^3$, $R^4$, and $R^5$ are each independently hydrogen or a C1 to C3 alkyl group,
$L^1$, $L^3$, $L^5$, and $L^7$ are each independently —C(=O)—, —C(=O)O—, —OC(=O)—, —O—, or —C(=O)NH—,
$L^2$, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group,
x and y are each independently an integer of 0 to 2,
a, b, c, d, e, and f are each independently an integer of 0 to 2,
$M^+$ is an alkali metal, and
\* indicates a bond to an adjacent structural unit.

10. The separator of claim 1, wherein the (meth)acrylic copolymer has a weight average molecular weight of 200,000 to 700,000.

11. The separator of claim 1, wherein the (meth)acrylic copolymer is included in an amount of 1 wt % to 5 wt % based on a total amount of the coating layer.

12. The separator of claim 1, wherein the coating layer has a thickness of 1 to 5 μm.

13. A lithium secondary battery, comprising
a positive electrode, a negative electrode, and the separator of claim 1 between the positive electrode and the negative electrode.

\* \* \* \* \*

UNITED STATES PATENT AND TRADEMARK OFFICE
CERTIFICATE OF CORRECTION

PATENT NO. : 12,300,849 B2
APPLICATION NO. : 17/294343
DATED : May 13, 2025
INVENTOR(S) : Gain Kim et al.

Page 1 of 1

It is certified that error appears in the above-identified patent and that said Letters Patent is hereby corrected as shown below:

In the Claims

In Column 20, Line 36, in Claim 3, delete "copolymer:a" and insert -- copolymer: a --.

In Column 22, Lines 18-19, in Claim 9, delete "—C(=O) NH—," and insert -- —C(=O)NH—, --.

Signed and Sealed this
Twenty-first Day of October, 2025

John A. Squires
*Director of the United States Patent and Trademark Office*